Sept. 1, 1959  A. D. ASHCROFT  2,901,907
SWIMMING POOL TEMPERATURE INDICATOR
Filed May 6, 1957
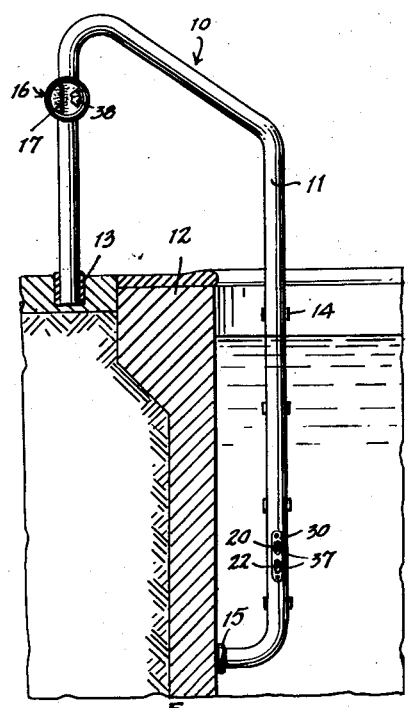
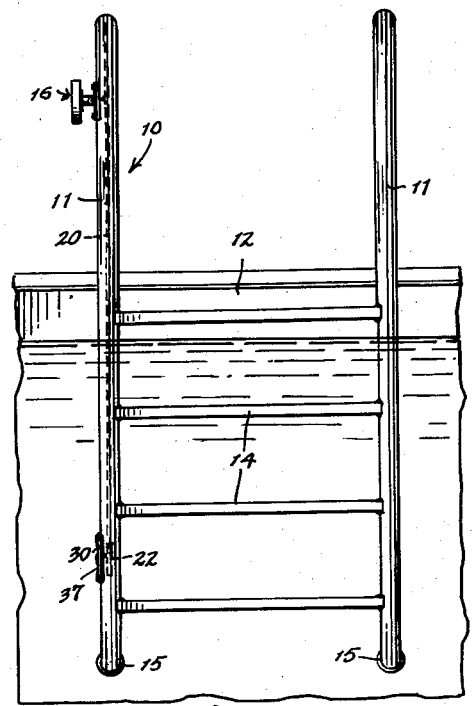
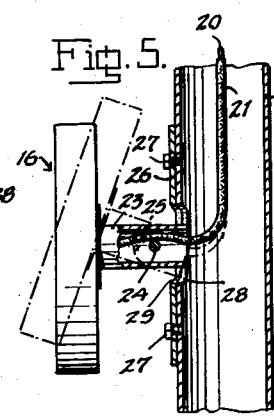
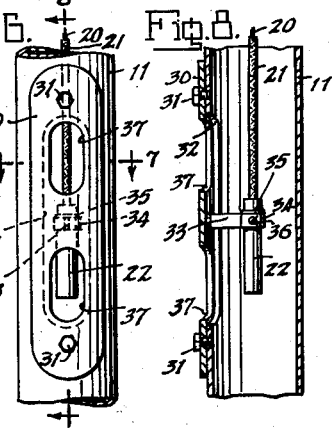
INVENTOR.
ALLAN D. ASHCROFT
BY
ATTORNEY

2,901,907

SWIMMING POOL TEMPERATURE INDICATOR

Allan D. Ashcroft, Stratford, Conn.

Application May 6, 1957, Serial No. 657,218

2 Claims. (Cl. 73—343)

The present invention relates to a swimming pool temperature indicator and has for an object to provide a device of this character incorporated in the ladder usually forming part of the permanent equipment of a swimming pool installation. In particular, such ladders have sides formed of metal tubing which include arched handle portions anchored to the upper side of the swimming pool wall, and step carrying portions which extend into the pool.

It is proposed to provide a temperature indicator forming part of one of the tubular ladder sides and including a visible indicating part secured at a convenient location upon the handle portion of the side, a temperature sensitive bulb disposed within the tubing at a suitable depth below the water level, and a capillary tube connected between the bulb and the indicator and extended through the tubing. With this arrangement the indicator is at a position where it may be readily read, and at the same time will not interfere with the function of the handle portion of providing a hand grip for persons entering or leaving the pool, the capillary tube is protected against damage from contact therewith, and the temperature sensitive bulb is at a constant position below the water level whereby the temperature readings are always based upon given conditions, i.e., it is permanently located at a depth where the water temperature is of a mean or average value, as distinguished from the usual method of determining the water temperature by suspending a thermometer in the pool and thereupon withdrawing it to read the temperature, this procedure being usually carried out without regard to maintaining constant conditions for successive readings.

A further object is to provide a temperature indicating device which may be incorporated in a tubular ladder side without substantial alteration in its structure, so that the device may be readily installed in conventional ladders.

Another object is to provide means whereby the temperature sensitive bulb may be fixedly supported within the tube so that it will not be subject to moving about through movement of the water in the pool, and so that there will be no strain from the weight of the bulb upon the capillary tube.

A further object is to provide an indicator part which may be readily adjusted to different angular positions for more convenient reading.

A still further object is to provide an indicator part in which an air temperature indicator may be conveniently combined with the water temperature indicator.

Other objects and advantages of the invention will become apparent from a consideration of the following detailed description taken in connection with the accompanying drawing wherein a satisfactory embodiment of the invention is shown. However, it will be understood that the invention is not limited to the details disclosed but includes all such variations and modifications as fall within the spirit of the invention and the scope of the appended claims.

In the drawing:

Fig. 1 is a vertical sectional view through the wall of a swimming pool, and showing the ladder side in side elevation with the temperature indicating device of the invention incorporated therein;

Fig. 2 is a front elevation, and showing the side of the ladder extended into the pool;

Fig. 3 is a fragmentary enlarged side elevation showing the indicator part of the device;

Fig. 4 is a horizontal sectional view taken along the line 4—4 of Fig. 3;

Fig. 5 is a vertical sectional view taken along the line 5—5 of Fig. 3 and showing in dot-and-dash lines an angularly adjusted position of the indicator;

Fig. 6 is a fragmentary side elevation of the temperature sensitive bulb part of the device;

Fig. 7 is a horizontal sectional view taken along the line 7—7 of Fig. 6; and

Fig. 8 is a vertical sectional view taken along the line 8—8 of Fig. 6.

Referring to the drawing, the ladder indicated generally as 10, comprises two sides 11—11 formed of metal tubing and suitably bent to form an arched handle portion anchored to the upper side of the pool wall 12 by engagement of the end of the tubing in a suitable anchor socket 13 at a suitable distance outwardly from the vertical side of the pool. The ladder sides extend for a suitable depth into the pool and are connected by a series of steps 14, preferably welded to the ladder sides, and the lower ends of the sides are bent inwardly and provided with rubber bumpers 15 which engage against the side wall of the pool. This is a conventional type of ladder, and it will be understood that the invention may be incorporated in other conventional types employing metal tubing sides.

The temperature indicating device is incorporated in one of the sides 11 and consists of an indicator unit 16 having a temperature indicator 17 mounted therein, the illustrated embodiment showing this indicator as a transparent graduated stem of glass, plastic, or the like, having a capillary bore in which suitable thermo-sensitive indicating liquid 18 is contained, suitable calibrations 19 being provided in relation to the tube to determine the temperature reading. The lower end of the tube 17 is connected to a flexible capillary tube 20 of copper provided with a braided wire protective covering 21, for example, and which, as will presently more fully appear, is extended through the metal tube 11 to a point below the surface of the water level of the pool where it is provided at its end with a temperature sensitive bulb 22.

The indicator unit 16 is preferably mounted upon the outer side of the inner vertical portion of the ladder side at a point below the hand grip portion, so that it will not interfere with the normal use of the ladder, and to this end it is provided upon its inner side with a tubular arm 23 pivotally mounted by means of a bolt 24 between a pair of ears 25 provided upon a mounting plate 26 secured by bolts 27—27 to the metal tubing 11, the mounting plate being suitably curved to correspond to the cylindrical outer surface of the tubing and the tubing having an opening 28 provided therein in substantial register with an opening 29 provided in the mounting plate between the ears 24. The inner end of the tubular arm 23 extends through the openings 29 and 28 and these openings are of sufficient size to permit of angular adjustment of the indicating unit 16 about the horizontal axis of the bolt 24, so that the indicating unit may, if desired, be tilted to an angular position for more convenient reading, as shown by the dot-and-dash lines in Fig. 5. Also, it is pointed out that the openings 28 and 29 permit air to escape from the metal tubing 11 so that as water from the pool flows into the tube, as will presently more fully appear, there will be no air trap created within the tubing. The opening 28 is also of sufficient size to permit insertion of the bulb 22 into the tubing during installation of the device, the bulb being carried from the opening 28 through the handle part of the tubing and thence down through the vertical portion of the tubing within the pool, the length of the flexible capillary tube 20 being such that the bulb will be disposed at the desired depth below the water level.

The bulb 22 is secured at its point of location within the tubing 11 and to this end a mounting plate 30 is provided which is secured by bolts 31—31 over a slot opening 32 provided in the tubing 11, the plate 30 being shaped at its inner side to correspond to the cylindrical outer surface of the tubing. An arm 33 is secured to the inner side of the mounting plate 30 and at its inner end is provided with a collar 34 in which the bulb 22 is engaged, the bulb preferably having an annular shoulder 35 adjacent its upper end which rests upon the collar. The arm 33 is of such length that the collar is disposed substantially centrally within the tubing 11 and thus supports the bulb 22 centrally. The collar preferably engages the bulb under slight spring pressure, but it will be understood that any suitable connection may be provided, for instance, the collar may be provided with a set screw 36 for securing the position of the bulb. Holes 37—37 are provided in the mounting plate so as to permit free flow of the water in the pool into the tubing 11, whereby the temperature sensitive bulb 22 will at all times be subjected to the temperature of the water in the pool at the particular depth at which it is located.

The slot opening 32 is of sufficient length and width to permit the bulb 22 to freely pass through it, so that, in installing the device, the bulb, after moving down through the tubing to its location point opposite the slot opening, may be drawn outwardly and thereupon slipped into the collar 34 before attachment of the mounting plate 30. The mounting plate is thereupon positioned over the opening and secured by the bolts 31, thus fixedly positioning the bulb centrally within the tubing 11.

The temperature indicating unit, in addition to the water temperature indicator, is also preferably provided with an air temperature indicator 38, which is shown as of the type having a Bourdon tube operated pointer moving over a calibrated dial. In this respect, it is pointed out that both the water and the air temperature indicators may be of any suitable type, and, in particular, the water temperature indicator may be of the Bourdon tube type connected in the well known manner to a capillary tube.

What is claimed is:

1. In combination with a normally stationary swimming pool ladder including a side formed of metal tubing having portions extending respectively above and below the water level in the pool, a water temperature indicator comprising a temperature indicator unit mounted exteriorly upon said tubing above the water level, a temperature sensitive bulb within said tubing below the water level, and a capillary tube extending from said indicator unit through said tubing to said bulb, said tubing having an opening above the water level through which said capillary tube extends to said indicator unit, and having a water inlet opening below the water level in proximity to said bulb.

2. The invention as defined in claim 1, further characterized by a cover member secured to said tubing and supporting said bulb substantially centrally thereof, and wherein said tubing has an opening normally closed by said cover member and of a size to permit passage of said bulb therethrough, and said cover member has water inlet openings communicating through said opening of said tubing with the interior of said tubing.

References Cited in the file of this patent
UNITED STATES PATENTS

| | | |
|---|---|---|
| 233,906 | Adams | Nov. 2, 1880 |
| 1,688,832 | Sartakoff | Oct. 23, 1928 |
| 2,790,617 | Harland | Apr. 30, 1957 |